(12) United States Patent
Pichlmaier et al.

(10) Patent No.: US 11,833,454 B2
(45) Date of Patent: Dec. 5, 2023

(54) END PLATE, FILTER ELEMENT, FILTER SYSTEM AND METHOD FOR FILTERING LIQUID

(71) Applicant: ARGO-HYTOS GROUP AG, Baar (CH)

(72) Inventors: Valentin Pichlmaier, Bretten (DE); Roland Krämer, Hambrücken (DE)

(73) Assignee: ARGO-HYTOS GROUP AG, Baar (CH)

( * ) Notice: Subject to any disclaimer, the term of this patent is extended or adjusted under 35 U.S.C. 154(b) by 85 days.

(21) Appl. No.: 17/489,082

(22) Filed: Sep. 29, 2021

(65) Prior Publication Data

US 2022/0016549 A1    Jan. 20, 2022

Related U.S. Application Data

(62) Division of application No. 16/491,895, filed as application No. PCT/EP2018/061724 on May 7, 2018, now abandoned.

(30) Foreign Application Priority Data

May 9, 2017    (DE) ................ 10 2017 109 924.7

(51) Int. Cl.
*B01D 27/08*    (2006.01)
*B01D 29/13*    (2006.01)
(Continued)

(52) U.S. Cl.
CPC ............. *B01D 27/08* (2013.01); *B01D 29/13* (2013.01); *B01D 35/147* (2013.01); *B01D 35/30* (2013.01);
(Continued)

(58) Field of Classification Search
CPC .. B01D 35/143; B01D 35/147; B01D 35/475; B01D 2201/4061
See application file for complete search history.

(56) References Cited

U.S. PATENT DOCUMENTS 3,259,247 A  *  7/1966  Tietz ................ B01D 29/15
                                                210/440
3,485,380 A     12/1969  Offer et al.
(Continued)

FOREIGN PATENT DOCUMENTS

CN    204411845 U    6/2015
DE    4318215 A1    12/1994
(Continued)

OTHER PUBLICATIONS

International Search Report (In English and Germany) issued in PCT/EP2018/061724, dated Aug. 24, 2018, 12 pages.

*Primary Examiner* — Benjamin M Kurtz
(74) *Attorney, Agent, or Firm* — Hamre, Schumann, Mueller & Larson, P.C.

(57) ABSTRACT

The invention relates to an end plate for filter material (10) for filtering a liquid, particularly a hydraulic oil, having a through opening (11) for filtered liquid, which is surrounded by a sealing ring (20) for a connecting piece, and a cover (12) for the filter material (10). The invention is characterized in that the sealing ring (20) delimits a free space (13) for accommodating an anti-rotation lock (14) of a switch (15) and/or a bypass valve (16) of a filter system (30). Furthermore, the invention relates to a filter element, a filter system and a method for filtering liquid.

3 Claims, 2 Drawing Sheets

(51) Int. Cl.
*B01D 35/147* (2006.01)
*B01D 35/30* (2006.01)
*F15B 21/041* (2019.01)

(52) U.S. Cl.
CPC .. *B01D 2201/291* (2013.01); *B01D 2201/295* (2013.01); *B01D 2201/347* (2013.01); *B01D 2201/4076* (2013.01); *F15B 21/041* (2013.01)

(56) References Cited

U.S. PATENT DOCUMENTS

| | | | |
|---|---|---|---|
| 3,896,280 A * | 7/1975 | Blake | F16K 37/0041 |
| | | | 137/554 |
| 4,452,697 A | 6/1984 | Conrad | |
| 5,985,144 A | 11/1999 | Janik et al. | |
| 8,123,938 B2 | 2/2012 | Baumgaertner et al. | |
| 2003/0205521 A1 | 11/2003 | Yates | |
| 2005/0077231 A1 | 4/2005 | Bhardwaj | |
| 2010/0000916 A1 | 1/2010 | Eberle et al. | |

FOREIGN PATENT DOCUMENTS

| | | |
|---|---|---|
| DE | 202006001950 U1 | 6/2007 |
| DE | 102012209242 A1 | 12/2013 |
| DE | 102013106264 A1 | 12/2014 |
| EP | 1354617 A1 | 10/2003 |
| EP | 2092970 A1 | 8/2009 |
| WO | 98/43723 | 10/1998 |

* cited by examiner

END PLATE, FILTER ELEMENT, FILTER SYSTEM AND METHOD FOR FILTERING LIQUID

The invention relates to an end plate for filter material for filtering a liquid, particularly a hydraulic oil. An end plate of this type is known for example from DE 10 2013 106 264 A1. The invention further relates to a filter element for filtering a liquid, a filter system and a method for filtering liquid.

Hydraulic systems are used for example in construction machines, agricultural machines, machine tools or processing machines. The hydraulic oil used in hydraulic systems is usually filtered. The filter elements used for this absorb the dirt particles from the hydraulic oil and must be replaced after a certain time.

In this context, DE 10 2013 106 264 A1 describes a filter element for filtering a liquid, with an end plate, which is divided into two parts and has a fixed and a movable plate part, as a result of which the replacement of the filter element is facilitated. A further filter element is known from EP 2 092 970 A1. The known filter elements do not make it possible to automatically determine the degree of contamination of the filter material.

The invention is based on the object of specifying an end plate for filter material, for filtering a liquid, which allows the use of a contamination indicator and/or a bypass valve in a filter element or a filter system with such a filter element. The invention is further based on the object of specifying a filter element, a filter system and a method for filtering liquid.

According to the invention, the object is achieved with regards to the end plate as described herein. With regards to the filter element, the filter system and the method for filtering liquid, the object is achieved as described herein.

The invention is based on the idea of specifying an end plate for filter material for filtering a liquid, particularly a hydraulic oil, having a through opening for filtered liquid, which is surrounded by a sealing ring (20) for a connecting piece, and a cover for the filter material. The sealing ring delimits a free space for accommodating an anti-rotation lock of a switch and/or bypass valve of a filter system.

The invention has the advantage that the anti-rotation lock moves in free space during the actuation of the switch and/or the bypass valve, i.e. can be moved into the free space or out of the free space. The anti-rotation lock is used to guide the switch and/or the bypass valve in a predetermined position in the filter head, so that for example an optimum flow behaviour of the bypass valve or the optimum position of the switching components of the switch is achieved during mounting and during operation. The bypass valve and/or the switch require a minimum travel for actuation and correct mode of action. The free space of the end plate according to the invention means that the anti-rotation lock is effective over the entire travel without the anti-rotation lock colliding with the end plate. In the maximum position, for example in the rest position of the switch and/or the bypass valve, the anti-rotation lock can on the one hand dip completely into the free space of the end plate. On the other hand, a sufficiently large adjustment path is available for actuating the switch and/or the bypass valve, in which the anti-rotation lock guides or holds the switch and/or the bypass valve in the desired position.

The delimiting of the free space by the sealing ring provides the design prerequisite for making the filter system compact, because the anti-rotation lock can be arranged in the vicinity of the sealing ring, specifically on the sealing ring. This means that the anti-rotation lock can be arranged close to the through opening in the mounted state. The sealing ring forms the inner wall of the free space and seals against the outlet connection in the mounted state.

The sealing ring is preferably constructed in one piece with the end plate.

Therefore, the end plate according to the invention makes it possible not only to equip a filter system with a switch and/or a bypass valve, but even to use a switch and/or bypass valve, which require a particularly large travel. The switch can be used in order to indicate a particular degree of contamination of the filter element. Instead of the switch or in addition to the switch, the end plate can be used with a bypass valve, which allows a safety function, for example switching off the filter function, when a particular degree of contamination is reached.

The end plate is marketable as such and is therefore disclosed and claimed independently of the filter element. In addition, the end plate is disclosed and claimed in connection with the filter element. The end plate forms part of the filter element.

In the installed state, the end plate functions as the interface of the filter element to the filter system, in which the filter element is used. In this case, the end plate is used on the one hand to transfer the filtered liquid into the filter head of the filter system. On the other hand, the end plate is used to enable the switch function or bypass functions of the filter head. To this end, the free space for the anti-rotation lock according to the invention is provided in the end plate. The anti-rotation lock as such does not form part of the end plate but interacts with the same in the installed state. The anti-rotation lock is part of the filter head or the components integrated into the filter head, specifically of the switch and/or the bypass valve.

Preferred embodiments of the invention are indicated in the dependent claims.

In a preferred embodiment, the free space is constructed as an accommodating pocket, which extends between the sealing ring and the cover and has a base. The anti-rotation lock is arranged in the free space between the sealing ring and the cover. This embodiment has the advantage that a structurally beneficial movement direction of the switch and/or the bypass valve, specifically in the axial direction of the filter element or along the flow direction of the liquid, is possible due to the end plate. The invention is not limited to end plates through which axial flow is possible. Other geometries of the end plate are possible. The accommodating pocket has the further advantage that the accommodating pocket has a base, so that the filter space adjoining the end plate is sealed.

The accommodating pocket is preferably of annular construction. On the one hand, this has the advantage in terms of production technology, that the end plate can for example be constructed as an injection-moulded part with flow paths of virtually equal length. On the other hand, the end plate is simple to mount, as it is not necessary to align the end plate relatively to the anti-rotation lock.

In a further preferred embodiment, the cover has an inner ring, wherein the accommodating pocket is constructed between the sealing ring and the inner ring. The inner ring allows an optimal utilization of the overall height of the filter element, as the axial end of the filter material can be arranged in the region of the inner ring and therefore higher than the base of the accommodating pocket, particularly at the same height as the accommodating pocket.

The height position of the base or of the axial end of the filter material relates to the longitudinal extent of the filter element.

The inner ring may form a positioning ring for a support tube and consequently has a dual function, as the inner ring forms the outer wall of the free space or the accommodating pocket and positions the support tube. Also, in this embodiment, the inner ring is constructed in one piece with the end plate.

In a particularly preferred embodiment, the free space has a depth in the axial direction with respect to the longitudinal extent of the sealing ring, which at least corresponds to the penetration depth of the anti-rotation lock into the free space. Penetration depth is understood to be the distance by which the anti-rotation lock is moved into the free space. This embodiment is advantageous in connection with the accommodating pocket in particular, because in this manner, the anti-rotation lock is reliably prevented from colliding with the base of the end plate.

Preferably, the sealing ring has an upper edge, wherein the depth is at least 5 mm, particularly at least 10 mm, in particular at least 15 mm from the upper edge of the sealing ring. Thus, a sufficiently long adjustment path is available for the anti-rotation lock.

Furthermore, the free space, the accommodating pocket in particular, preferably has a width in the radial direction starting from the sealing ring, which is at least 2 mm. This has the advantage that the anti-rotation lock can be constructed in a sufficiently stable manner.

With regards to the advantages of the filter element and the filter system, reference is made to the statements in connection with the end plate.

In the case of the filter system, one advantageous embodiment is that the bypass valve, in the switched state, connects the inlet side of the filter head and the outlet side of the filter head. This has the advantage that emergency operation of the filter system is possible if the filter material has reached a certain degree of contamination. In this case, it is accepted that the filter function is at least limited, specifically at most until the filter material is replaced.

A further advantageous embodiment of the filter system is that the switch comprises a reed contact for generating a signal for a contamination indicator. Reed contacts are known as hermetically sealed switches which are actuated by means of an external magnetic field and are very suitable for use in a hydraulic filter system. Accordingly, the switch comprises a magnetic element which interacts with the reed contact. The invention is not limited to certain reed contact types.

In the context of the method according to the invention, it is provided that liquid to be filtered is supplied to a filter system according to the invention, filtered in the filter material and discharged through the through opening of the end plate as filtered liquid. The switch and/or the bypass valve are actuated from a differential limit pressure between the liquid to be filtered and the filtered liquid.

As a result, the degree of contamination can be indicated and/or emergency operation of the filter system can be initiated.

The invention is explained in more detail in the following with further details and with reference to the attached schematic drawings on the basis of an exemplary embodiment.

In the figures

FIG. 1 shows a filter system 30 for use in a hydraulic system, for example for a construction machine, agricultural machine, machine tool or processing machine. The filter system 30 is generally suitable for hydraulic systems in which hydraulic fluid, particularly hydraulic oil must be filtered.

Figure 1:
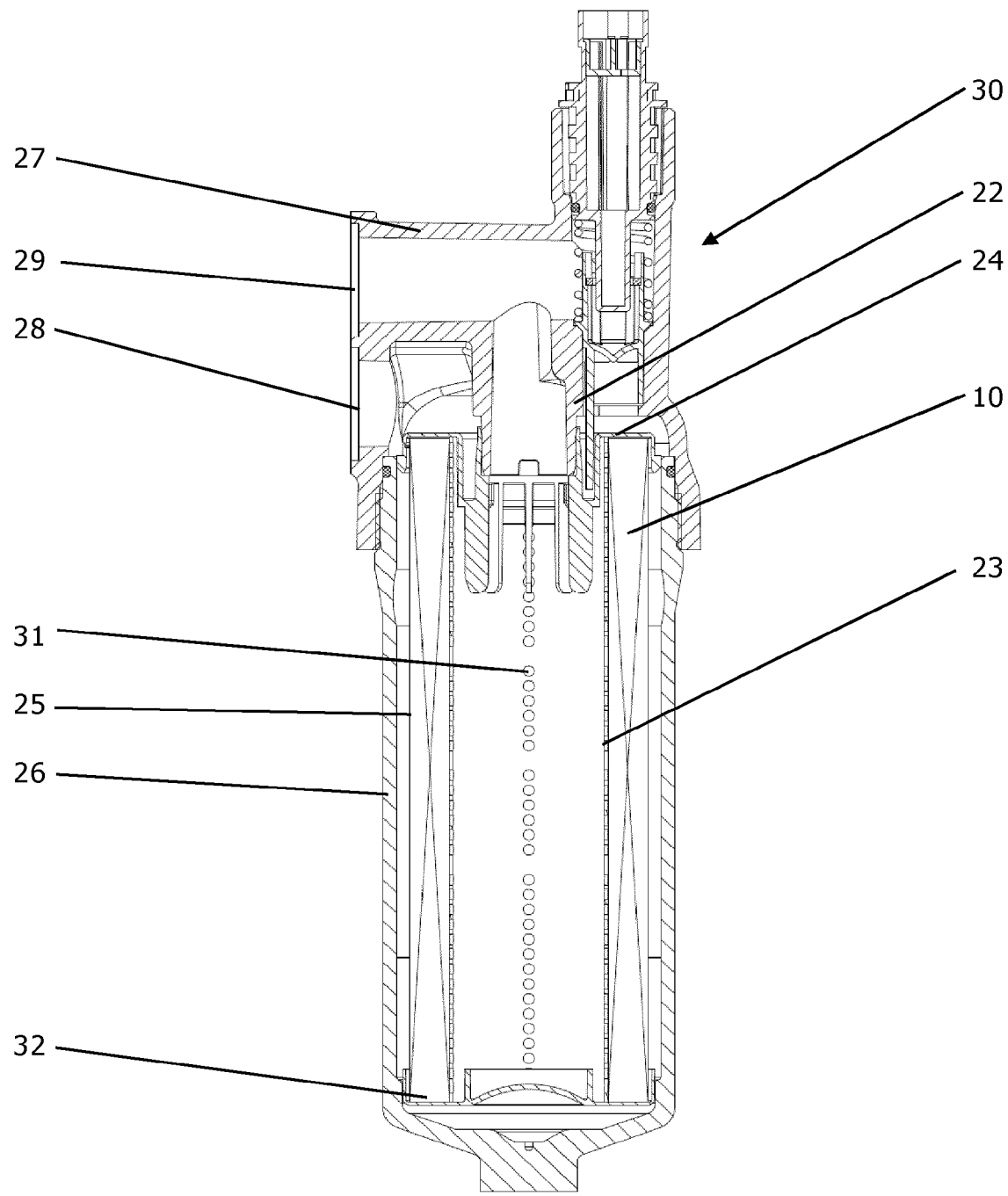
FIG. 1 shows the section of a filter system with a filter element and an end plate according to an exemplary embodiment according to the invention.

The filter system 30 has a filter head 27 with a first connection 28 and a second connection 29. Hydraulic fluid to be filtered enters the filter system through the first connection 28 during the use of the filter system 30. The filtered hydraulic fluid exits the filter system 30 through the second connection 29. The filter head 27 is connected in a sealed manner, for example screwed, to a filter housing 26. A filter element 25 is arranged in the filter housing 26. The filter element 25 comprises a filter material 10, which effects the filter function during operation. The invention is not limited to certain filter materials. Preferably, the filter material 10 is constructed from layers folded in a star-shaped manner. The superordinate contour or outer contour of the filter material 10 is cylindrical. In other words, the macroscopic shape of the filter material 10 is cylindrical and the microscopic shape of the filter material 10 is star-shaped. The inner wall of the cylindrical filter material 10 bears against a support tube 23, which has through openings 31 for the hydraulic fluid arranged in the longitudinal direction and in a distributed manner on the circumference. The support tube 23 supports the filter material 10 in the radial direction.

In the axial direction, the filter element 25 is delimited by two end plates 24, 32. The two end plates 24, 32 bear against the end faces of the filter material 10. The end plates 24, 32, the support tube 23 and the filter material 10 together form the filter element 25, which can be handled and marketed as one unit. The filter element 25 forms a wearing part, which is replaced as a whole when the filter material 10 is contaminated.

The end plate 32, which is arranged at the bottom in the installation direction of the filter element 25, is closed and seals the interior of the support tube 23 and the filter material 10 in the filter housing 26 downwards. The end plate 24, which is arranged at the top in the installation direction of the filter element 25, has a through opening 11, through which the filtered hydraulic oil or, in general, the filtered hydraulic fluid exits the filter element 25. The through opening 11 is arranged centrally in the end plate 24, i.e. in the middle. It is also conceivable that the through opening 11 is arranged eccentrically. In the example according to FIG. 1, the filter material 10, the support tube 23 and the through opening 11 are arranged coaxially. A different arrangement of these components is possible.

The upper end plate 24 furthermore has a cover 12, against which, in the installed state, the filter material 10, specifically the end face of the filter material 10 bears. The cover 12 has an annular disc 43, which is arranged coaxially to the through opening 11. The cover furthermore has an inner ring 21 and an outer ring 33, which are connected to the annular disc 43 in each case. The inner ring 21 and the outer ring 33 are arranged coaxially and, with the disc 43, form an annular receptacle for the axial end of the filter material 10. The inner ring 21 and the outer ring 33 overlap the filter material 10 at least to some extent.

A plurality of spacers 34 are arranged at the outer ring 33, for example in the form of lugs, which position the filter element 25 in the housing in the filter housing 26 in such a manner that an annular gap is formed between the filter material 10 and the inside of the filter housing 26.

Other geometries of the end plate 24 are possible.

During operation, the hydraulic oil to be filtered flows through the first connection 28 into the filter head 27 and from there radially outwards, past the upper end plate 24 into an annular gap between the filter element 25 and the filter housing 26. From there, the hydraulic oil flows through the filter material 10 in the radial direction, flows through the support tube 23 and from there is conveyed in the cleaned state through the through opening 11 back into the filter head 27 again. There, the cleaned hydraulic oil exits through the second connection 29.

Figure 2:
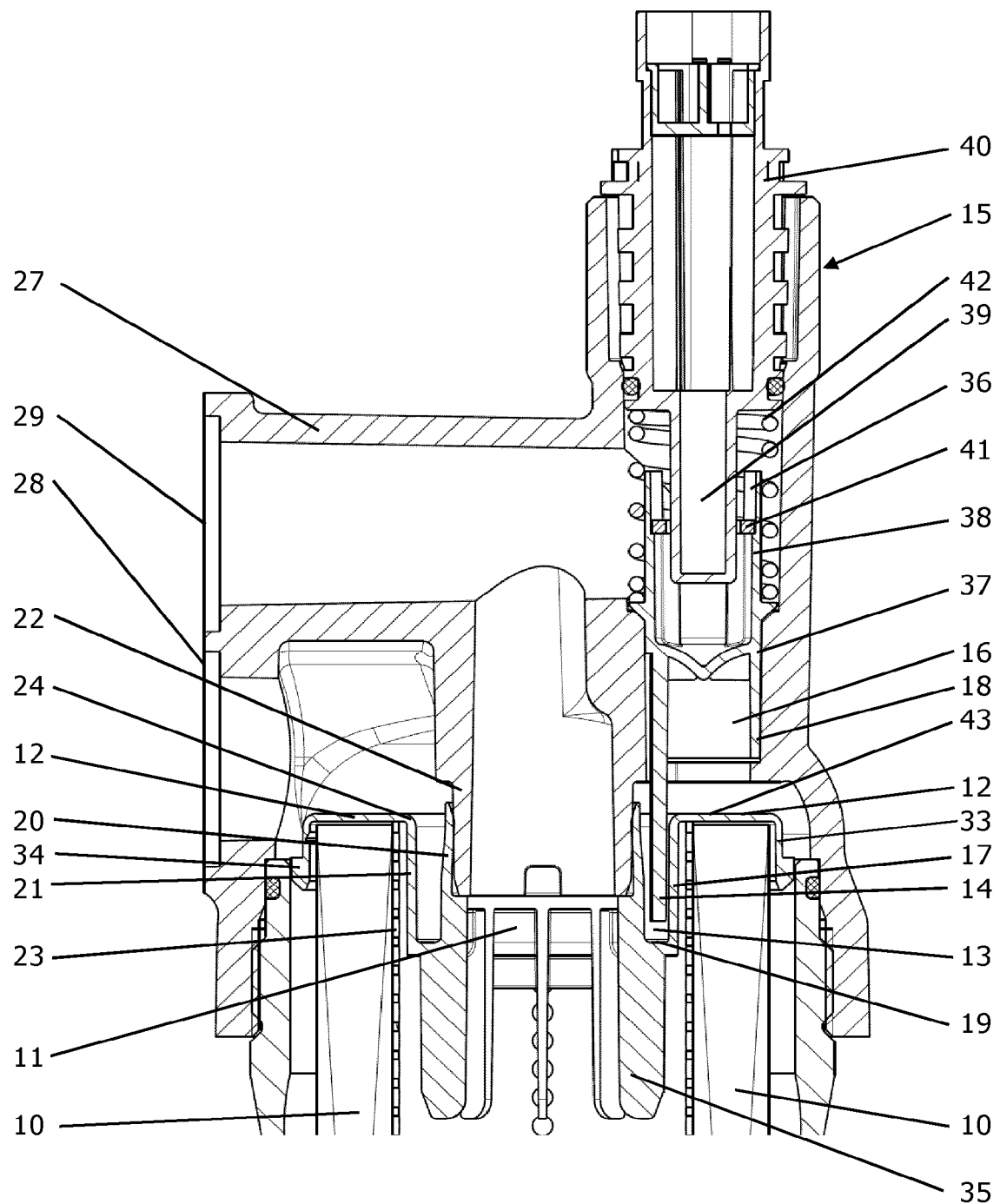
FIG. 2 shows a detail view of the filter system according to FIG. 1 in the region of the end plate.

The upper end plate 24 is illustrated enlarged in FIG. 2.

There it can be seen that a free space 13 is formed between the through opening 11 and the cover 12, specifically the inner ring 21 of the cover 12, which, in the installed state, accommodates an anti-rotation lock 14 of a switch 15 and/or a bypass valve 16 of the filter head 27. The anti-rotation lock 14 is constructed in the example according to FIG. 2 as a pin-shaped projection or protrusion of the switch 15 or the bypass valve 16. The anti-rotation lock 14 protrudes in the installed state over the disc 43 of the cover 12 in the axial direction of the filter element 25. The anti-rotation lock 14 and the free space 13 are flush in the axial direction, so that the anti-rotation lock 14 can dip into the free space 13 when the switch 15 or the bypass valve 16 is in the rest position illustrated in FIG. 2. To this end, the depth of the free space 13, i.e. the extent of the free space 13 in the axial direction of the filter element 25 is dimensioned such that the anti-rotation lock 14 can be moved into the free space 13 completely without colliding with the end plate 24. Specifically, the section of the anti-rotation lock 14, which protrudes in the axial direction over the cover 12 or projects into the filter element 25, is accommodated in the free space 13 completely.

The free space 13 is constructed as an accommodating pocket 17, which extends parallel to the flow direction of the liquid through the through opening 11. In other words, the accommodating pocket 17 extends in the axial direction of the filter element 25. The accommodating pocket 17 has a base 19, which downwardly delimits the accommodating pocket 17, i.e. delimits and seals towards the interior of the support tube 23. This means that the cleaned liquid exits entirely through the through opening 11 and the dirty side is separated from the clean side of the filter system 30. The accommodating pocket 17 is of annular construction, so that during the mounting of the end plate, it is not necessary to determine the position thereof in the circumferential direction with respect to the anti-rotation lock 14.

The sealing ring 20 and the inner ring 21 are arranged coaxially and extend in the longitudinal direction of the filter element 25. The sealing ring 20 adjoins the through opening 11 and is used on the one hand to accommodate and seal a connecting piece 22 of the filter head 27. On the other hand, the sealing ring 20 forms the inner wall of the accommodating pocket 17. The inner ring 21 adjoins the annular disc 43 of the cover 12 and extends substantially parallel to the sealing ring 20. The inner ring 21 is used to position the support tube 23 at least during mounting. In addition, the inner ring 21 forms the outer wall of the accommodating pocket 17.

The accommodating pocket 17 can also be understood as the annular gap between the cover 12 and the through opening 11, which annular gap is closed at the bottom, i.e. in the direction of the lower end plate 32.

On the side of the end plate 24 facing away from the connecting piece 22, a plurality of axial ribs 35 are arranged on the circumference of the through opening 11, which axial ribs extend into the interior of the support tube 23 in the installed state.

As can be seen further in FIG. 2, the filter head 27 has a switch and valve unit 36, which comprises a switch 15 and a bypass valve 16 as an integrated component. It is also possible to construct the switch 15 and the bypass valve 16 as separate components with their own anti-rotation lock 14 in each case. The accommodating pocket 17 can accommodate a plurality of anti-rotation locks in a distributed manner on the circumference. It is also possible to provide only one switch 15 or only one bypass valve 16 in the filter head 27.

In the example according to FIG. 2, the anti-rotation lock 14 is arranged as a pin-shaped projection or protrusion on a valve body 37 of the bypass valve 16. The anti-rotation lock 14 and the valve body 37 are preferably constructed in one piece. The valve body 37 is constructed cylindrically. The anti-rotation lock 14 is arranged eccentrically with respect to the valve body 37, specifically on the circumference of the valve body 37. This has the advantage that the anti-rotation lock 14 can be arranged close to the through opening 11.

The valve body 37 has a piston 18, which is guided in a slidable manner in the filter head 27.

The bypass valve 16, specifically the valve body 37, has a plurality of flow openings, which are arranged in a distributed manner on the circumference of the bypass valve 16 or the valve body 37. In the rest state according to FIG. 2, the flow openings are closed, so that the clean side and the dirty side of the filter system 30 are separated.

The bypass valve 16 has an axial guide 38, for example in the form of guide ribs, which encompass a coaxially arranged pin 39 of the switch 15. The pin 39 is connected to a switch component 40, which is mounted securely in the filter housing 27 and which contains the electronics of the switch 15. The axial guide 38 of the bypass valve 16 is connected to a magnetic element 41, which can be moved on the pin 39 in the axial direction together with the bypass valve 16, when a corresponding differential limit pressure is reached. As a result, the switch 15 is actuated. A spring 42 is arranged between the valve body 37 and the fixedly arranged switch component 40, which spring ensures that the bypass valve 16 and the switch 15 remain in the rest position until the differential limit pressure is reached at a certain degree of contamination of the filter element 25. The reed contact itself can be open or closed in the rest position.

The anti-rotation lock 14 blocks a movement in the circumferential direction of the valve body 37 or in general of the bypass valve 16, so that the valve body 37 can essentially only be moved in the axial direction of the filter element 25. To this end, the anti-rotation lock 14 is in engagement with the filter head, for example by means of a corresponding groove in the filter head 27.

As the anti-rotation lock 14 protrudes in the direction of the filter element 25 over the valve body 37, it is achieved that the anti-rotation lock 14 remains in engagement with the filter housing 27, even if the bypass valve 16 or the switch 15 are actuated. Different switching points of the bypass valve 16 and the switch 15 can be set by means of the length of the anti-rotation lock 14. For example, the switch 15 may switch already at a lower differential limit pressure than the bypass valve 16 or vice versa.

The filter system according to FIGS. 1 and 2 functions as follows during use.

Hydraulic oil to be filtered is supplied to the filter element 25 through the first connection 28, which hydraulic oil flows through the filter material 10 in the radial direction. From the interior of the support pipe 23, the cleaned hydraulic oil passes through the through opening 11 back into the filter head 27 and from there through the second connection 29 back into the hydraulic system. With an increasing degree of contamination of the filter material 10, the back pressure in the region of the first connection 28 increases, which connection is fluidly connected via an annular space to the bypass valve, so that the bypass valve 16 is loaded with the corresponding pressure. When the differential pressure consequently created between the dirty side and the clean side of the filter system 30 exceeds a certain limit value, which results from the spring force of the spring, the bypass valve 16 is actuated, i.e. moved out of the rest position. In this case, the anti-rotation lock 14 is also moved in the axial direction, which remains in engagement with the filter housing 27 during the travelling movement of the bypass valve 16 and thus positions the bypass valve 16 and the switch 15 in the circumferential direction. The magnetic element 41 is entrained in the process, so that the switch 15 is actuated and indicates the degree of contamination. If the degree of contamination increases further, the bypass valve 16 is switched, so that the flow openings in the bypass valve 16 are enabled and the clean side is connected to the dirty side, bypassing the filter element 25 (bypass).

As soon as the contaminated filter element 25 has been replaced with a new filter element 25, the back pressure drops and the bypass valve and the switch 15 return to the rest position. In this case, the anti-rotation Lock 14 again dips into the free space 13 of the end plate 24.

REFERENCE LIST

10 Filter material
11 Through opening
12 Cover
13 Free space
14 Anti-rotation lock
5 Switch
16 Bypass valve
17 Accommodating pocket
18 Piston
19 Base
20 Sealing ring
21 Inner ring
22 Connecting piece
23 Support tube
24 (Upper) end plate
25 Filter element
26 Filter housing
27 Filter head
28 First connection
29 Second connection
30 Filter system
31 Through openings
32 (Lower) end plate
33 Outer ring
34 Spacer
35 Axial ribs
36 Switch and valve unit
37 Valve body
38 Axial guide
39 Pin
40 Switch component
41 Magnetic element
42 Spring
43 Disc

The invention claimed is:

1. A filter system comprising:
a filter element having an end plate and a filter material for filtering a liquid;
the end plate including a through opening for filtered liquid, a sealing ring surrounding the through opening, and a cover for the filter material;
the sealing ring delimits a free space;
the filter material includes an end that is fixed to the cover, and the filter material surrounds the through opening;
a filter housing in which the filter element is arranged;
a filter head connected to the filter housing; the filter head includes a fluid inlet, a fluid outlet, a switch and/or a bypass valve, and an anti-rotation lock which is connected to the switch and/or to the bypass valve, wherein the filter head and the free space of the end plate form an interface so that the anti-rotation lock can be moved into the free space and/or out of the free space upon actuation of the switch and/or the bypass valve.

2. The filter system according to claim 1, wherein the filter head includes the bypass valve, and wherein the bypass valve includes a switched state that fluidly connects the fluid inlet with the fluid outlet.

3. The filter system according to claim 1, wherein the filter head includes the switch, and wherein the switch comprises a reed contact.

* * * * *